United States Patent [19]

Richards et al.

[11] Patent Number: 5,343,241
[45] Date of Patent: Aug. 30, 1994

[54] DIGITAL VIDEO SIGNAL WITH INCREASED MOTION BLUR CHARACTERISTIC

[75] Inventors: John W. Richards, Stockbridge; Clive H. Gillard, Basingstoke, both of United Kingdom

[73] Assignee: Sony United Kingdom Limited

[21] Appl. No.: 964,050

[22] Filed: Oct. 21, 1992

[30] Foreign Application Priority Data

Dec. 20, 1991 [GB] United Kingdom ............... 9127122

[51] Int. Cl.⁵ .............................................. H04N 7/01
[52] U.S. Cl. .............................................. 348/97; 348/911
[58] Field of Search .................... 358/105, 133, 140; 348/97, 911; H04N 7/01, 11/20, 5/87, 5/253, 9/11

[56] References Cited

U.S. PATENT DOCUMENTS

| | | | |
|---|---|---|---|
| 4,873,573 | 10/1989 | Thomas et al. | 358/105 |
| 4,890,160 | 12/1989 | Thomas | 358/105 |
| 4,937,667 | 6/1990 | Choquet et al. | 348/911 |
| 4,942,466 | 7/1990 | Sandbank et al. | 358/133 |
| 5,016,101 | 5/1991 | Richards et al. | 358/140 |
| 5,016,102 | 5/1991 | Avis | 358/140 |
| 5,030,984 | 7/1991 | Buckler et al. | 358/105 |
| 5,057,921 | 10/1991 | Robert et al. | 358/105 |
| 5,068,727 | 11/1991 | Haghiri et al. | 358/105 |
| 5,084,755 | 1/1992 | Ozaki | 348/97 |
| 5,191,427 | 3/1993 | Richards et al. | 348/97 |

FOREIGN PATENT DOCUMENTS 2231228 11/1990 United Kingdom .
2249907 5/1992 United Kingdom .

Primary Examiner—Tommy P. Chin
Assistant Examiner—Richard Lee
Attorney, Agent, or Firm—William S. Frommer; Alvin Sinderbrand

[57] ABSTRACT

An input digital video signal representing a series of input frames is processed to produce an output digital video signal representing a series of output frames with an increased motion blur effect. For each output frame at least one intermediate field or frame is produced by motion compensated temporal interpolation between a pair of the input frames. Each output frame is then produced by combining the intermediate field or frame with at least one further intermediate field or frame and/or with one of the respective input frames so that the output frame has an increased motion blur characteristic compared with that of the input frames. Using motion compensated temporal interpolation, a change in frame rate can also be produced as between the input frames and the output frames.

12 Claims, 4 Drawing Sheets

DIGITAL VIDEO SIGNAL WITH INCREASED MOTION BLUR CHARACTERISTIC

BACKGROUND OF THE INVENTION

1. Field of the Invention

This invention relates to digital video signal processing.

2. Description of the Prior Art

Images recorded on film or video by cameras have a characteristic degree of motion blurring associated with them due to camera integration effects, for example caused by the finite shutter-open period of a shuttered camera.

Film drama is normally acquired with a 166° shutter angle at 24 frames per second, providing an integration time of 19.2 ms, whereas sports events are preferably shot with a much smaller shutter angle of, say, 30°, which in the case 24 frames per second gives an integration time of 3.5 ms. This allows the generally slower moving scenes in drama have a relatively smooth and fluid motion characteristic. On the other hand, for sports events, where motion may be of much higher speed, the smaller shutter angle is necessary to give adequate dynamic resolution, but the motion will look very 'strobe' like. Rather than 24 frames per second, nowadays scenes are sometimes shot at a 30 Hz frame rate so as to provide better dynamic resolution and also to provide better compatibility with 60 fields per second 2:1 interlace video equipment.

One problem with the known technology is that if it is desired to use the same mechanically rotary shuttered camera for both sports-type scenes with a short integration period and drama-type scenes with a long integration period, it is necessary either to replace the shutter or to use a complex adjustable shutter.

A further problem with the known technology is that, if a mechanically rotary shuttered CCD camera is used for acquisition at 30 frames per second, it is impossible to provide an integration time as long as 9.2 ms (which is considered to be the optimum for drama-type scenes). This is because fundamental to the operation of such a camera is the requirement that the shutter angle can never be greater than 180°, and thus the maximum integration time is 180/(360×30), or 16.7 ms.

OBJECT AND SUMMARY OF THE INVENTION

An object of the present invention is to process a digital video signal so as to simulate acquisition of the video with a different integration period than that actually used, and also to enable a digital video signal to be processed to simulate acquisition with a shutter angle of greater than 180°.

In accordance with one aspect of the present invention there is provided a method of increasing a motion blur characteristic of a digital video signal using motion compensated temporal interpolation. Motion compensated temporal interpolation is described in detail in patent applications GB 2231228A and GB 2249907A, the contents of which are incorporated herein as if printed in full below. The interpolation used in the present invention is a development of those earlier techniques.

In accordance with another aspect of the present invention, there is provided a method of processing an input digital video signal representing a series of input frames to produce an output digital video signal representing a series of output frames, in which:

for each output frame at least one intermediate field or frame is produced by motion compensated temporal interpolation between a pair of the input frames; and each output frame is produced by combining the intermediate field or frame with at least one further intermediate field or frame and/or with one of the respective input frames so that the output frame has an increased motion blur characteristic compared with that of the input frames.

The method may have a first mode in which more than two such intermediate frames are produced for each output frame, to produce a smooth motion blurring effect. The method may alternatively or additionally have a second mode in which only two such intermediate frames are produced for each output frame. This may be satisfactory for lower maximum speeds of motion in the picture. Either of these modes may have a first sub-mode in which the value of each pixel in each output frame is produced by averaging merely the values of the corresponding pixels in the respective intermediate frames. Alternatively or additionally, either of these modes may have a second sub-mode in which the value of each pixel in each output frame is produced by averaging the values of the corresponding pixels in not only the respective intermediate frames but also one of the respective input frames. The second sub-mode can be used when there is no change of frame rate as between the input and output frames and, as compared with the first sub-mode, enables a smoother motion blur to be produced without increasing the number of motion compensated temporal interpolation calculations which need to be carried out.

Alternatively or additionally, the method may have a third mode in which one such intermediate frame is produced for each output frame, wherein the value of each pixel in each output frame is produced by averaging the values of the corresponding pixels in the respective intermediate frame and one of the respective input frames. The third mode can be used when there is no change of frame rate as between the input and output frames and enables the increased motion blur to be produced with only one motion compensated temporally interpolated frame being required per output frame.

Alternatively or additionally, the method may have a fourth mode in which two such intermediate fields are produced for each output frame, each output frame being produced by interlacing the respective two intermediate fields. Thus, the increased motion blur is produced by an interlace smear effect.

Alternatively or additionally, the method may have a fifth mode in which one such intermediate field is produced for each output frame, each output frame being produced by interlacing the respective intermediate field with an opposite polarity field of one of the respective input frames. This fifth mode can be employed when there is no change of frame rate as between the input and output frames and enables the increased motion blur to be produced with only one motion compensated temporally interpolated field, as opposed to frame, being required per output frame.

The method may also include the step of selecting which mode or sub-mode to use in dependence upon the maximum speed of motion in the image represented by the input frames, Thus, for pictures with fast motion, the more computationally intensive modes can be selected, whereas for pictures with slow motion, the computationally quicker modes may be employed. Also, if there is no change of frame rate as between the input and output frames, for static pictures the method of the invention may be by-passed.

According to a further aspect of the invention, there is provided an apparatus for performing the above-mentioned methods.

Other objects, features and advantages of the present invention will become apparent upon consideration of the following detailed description of a preferred embodiment thereof, especially when considered with the accompanying drawings in which like reference numerals are employed to designate the same or similar components in the different figures.

DETAILED DESCRIPTION OF THE PREFERRED EMBODIMENT

Figure 1:
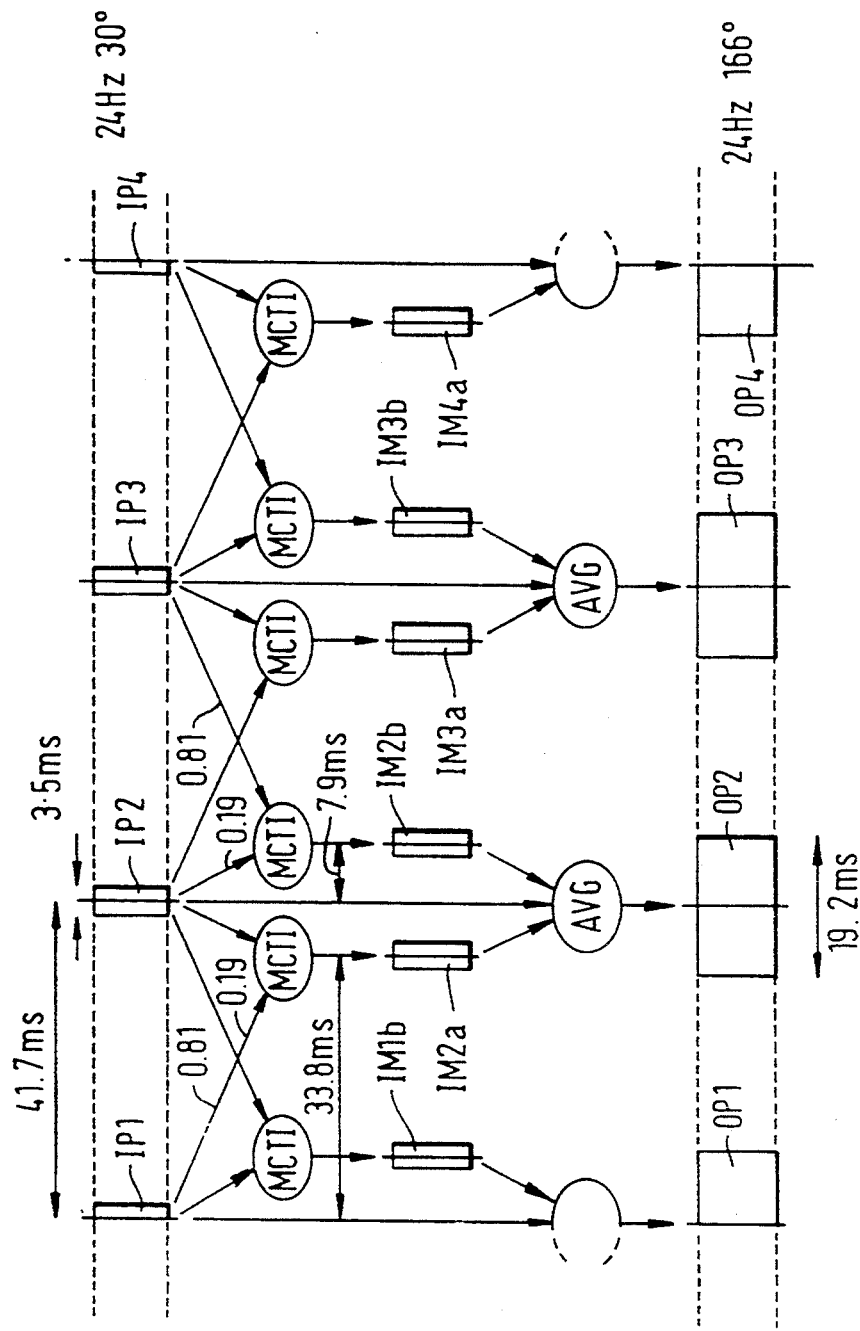
FIG. 1 is a schematic diagram illustrating a method for processing video acquired at 24 frame/s with a 30° shutter angle to simulate acquisition with a 166° shutter angle.
Figure 2:
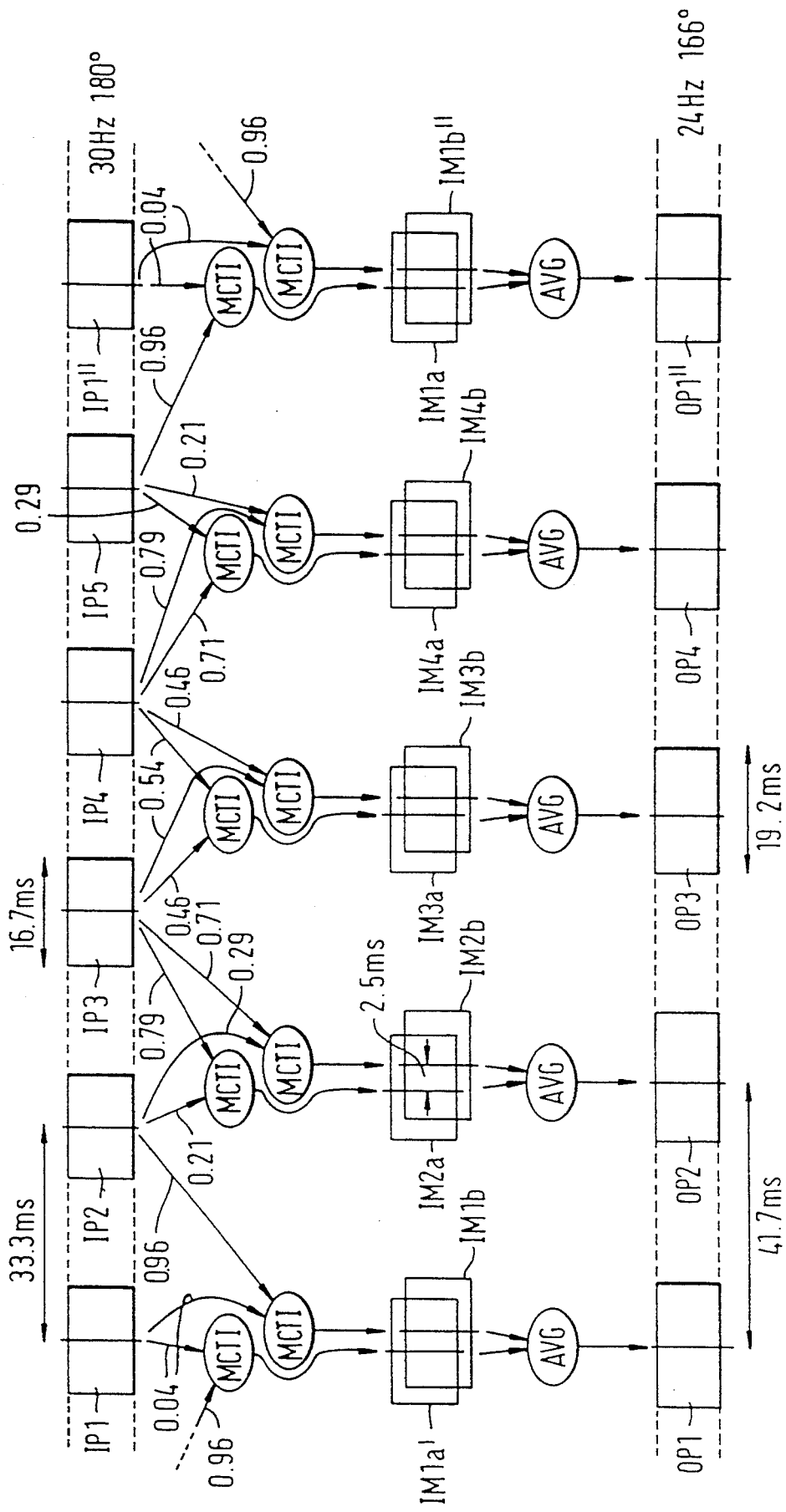
FIG. 2 is a schematic diagram illustrating a method of converting video acquired with a 180° shutter angle from a 30 Hz frame rate to a 24 Hz frame rate and for simulating a 166° shutter angle.
Figure 3:
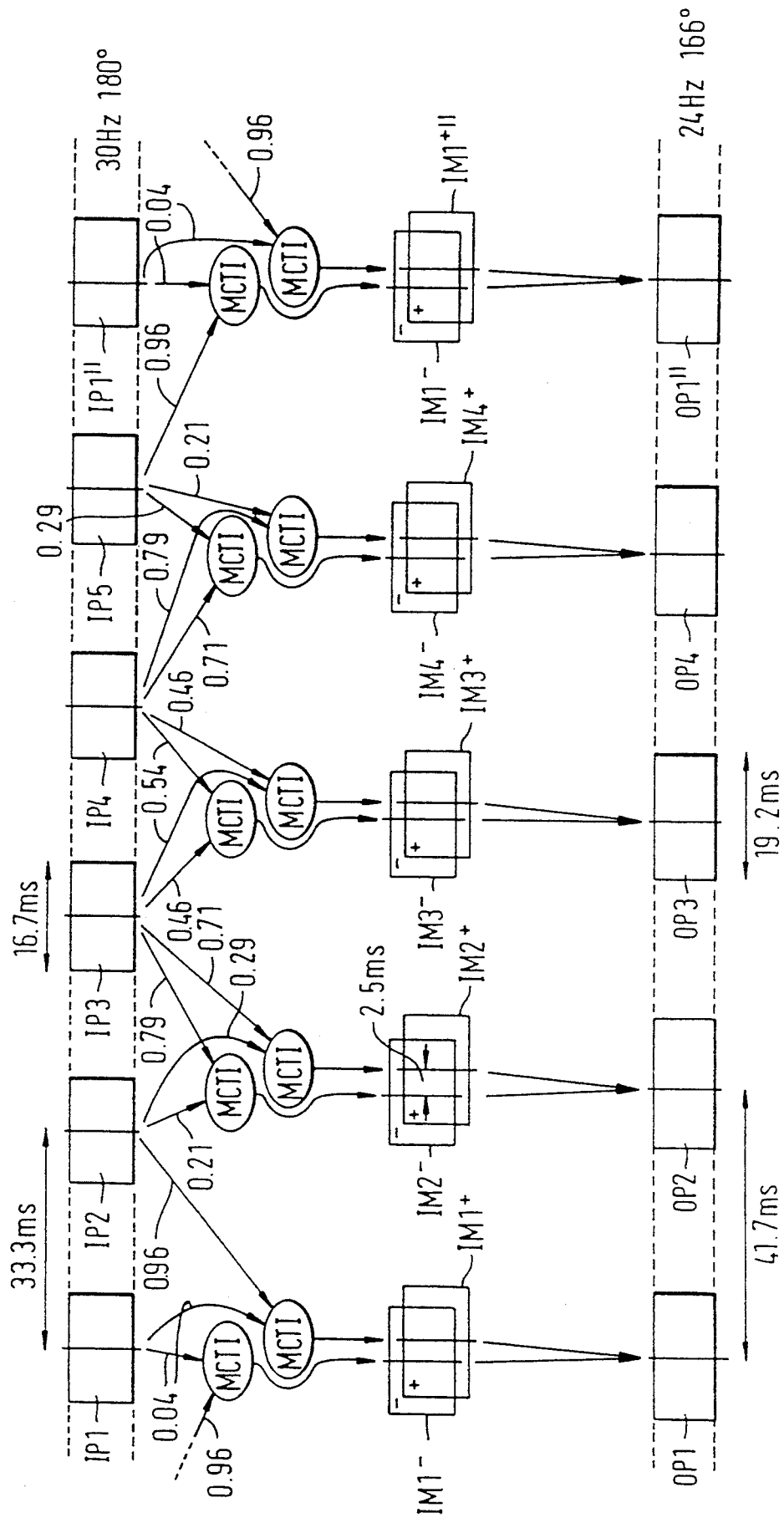
FIG. 3 is a schematic diagram showing a modification to the FIG. 2 method.

FIGS. 1 to 3 are temporal diagrams in the left-to-right direction and are process diagrams in the top-to-bottom direction. In these figures, frames or fields are each denoted by a rectangle having a vertical line therethrough. The width of each rectangle denotes the acquisition period or simulated acquisition period of the frame or field. Each vertical bar denotes a temporal reference point for the respective frame or field.

FIG. 1 illustrates a method for converting 24 Hz 1:1 video from a 3.5 ms acquisition time (i.e. a 30° shutter angle) to a 19.2 ms acquisition time (i.e. a 166° shutter angle). FIG. 1 shows part of a series of input frames $IP_1$ to $IP_4$ and part of a series of output frames $OP_1$ to $OP_4$ each temporally aligned with a respective one of the of the input frames. For each of the output frames $OP_i$, a respective pair of intermediate frames $IM_{ia}$, $IM_{ib}$ is produced, temporally offset before and after the respective output frame $OP_i$. The first $IM_{ia}$ of each pair of intermediate frames is produced by motion compensated temporal interpolation part-way between the preceding input frame $IP_{i-1}$ and the respective input frame $IP_i$, in this example with a temporal interpolation ratio of 0.81:0.19 and an equal weighting ratio of 0.5:0.5. The second $IM_{ib}$ of each pair of intermediate frames is produced by motion compensated temporal interpolation part-way between the respective input frame $IP_i$ and the succeeding input frame $IP_{i+1}$, in this example with a temporal interpolation ratio of 0.19:0.81 and an equal weighting ratio. In other words, given that the motion vectors for the pixels at locations (x,y) in frames $IM_{ia}$, $IM_{ib}$ are $(m_{xa}, m_{ya})$, $(m_{xb}, m_{yb})$, respectively, the values $IM_{ia}(x,y)$ $IM_{ib}(x,y)$ of the pixels at those locations are calculated as:

$$IM_{ia}(x,y) = \quad (1)$$

$$\frac{IP_{i-1}((x,y) - 0.81(m_{xa},m_{ya})) + IP_i((x,y) - 0.19(m_{xa},m_{ya}))}{2}$$

$$IM_{ib}(x,y) = \quad (2)$$

$$\frac{IP_i((x,y) - 0.19(m_{xb},m_{yb})) + IP_{i+1}((x,y) + 0.81(m_{xb},m_{yb}))}{2}$$

These interpolated frames each have a motion blur characteristic similar to that of the input frames, that is 3.5 ms. Each output frame $OP_i$ is then produced by averaging the respective input frame $IP_1$ and the respective pair of interpolated intermediate frames $IM_{ia}$, $IM_{ib}$. Specifically the value $OP_i(x,y)$ of a pixel at a location (x,y) in an output frame $OP_i$ is the average of the values $IP_i(x,y)$, $IM_{ia}(x,y)$ and $IM_{ib}(x,y)$ of the pixels at the corresponding locations (x,y) in the respective input frame $IP_i$ and the respective intermediate frames $IM_{ia}$, $IM_{ib}$, that is to say:

$$OP_i(x,y) = \frac{IM_{ia}(x,y) + IP_i(x,y) + IM_{ib}(x,y)}{3}$$

Each output pixel value therefore has a component simulating acquisition over a period 7.9±1.7 ms before the temporal reference point of the output frame, a component acquired ±1.7 ms about the temporal reference point, and a component simulating acquisition over a period 7.9 ms±1.7 ms after the temporal reference point. Therefore, the output frame approximates a simulation of acquisition over a period ±9.6 ms about the temporal reference point, corresponding to a shutter angle of 1660 ° at 24 frame/s.

In the arrangement shown in FIG. 1, there is no temporal overlap between the acquisition period and simulated acquisition periods of each triplet of frames $IM_{ia}$, $IP_i$, $IM_{ib}$, and with fast moving objects in the picture this may cause blotchiness of the motion blurring effect. Also, the arrangement of FIG. 1 is redundant if there is no motion in the picture. These problems can be solved by producing more or less than two intermediate frames in dependence upon the maximum speed of motion in the picture. For example, for a static picture, the production of the intermediate frames $IM_{ia}$, $IM_{ib}$ may be dispensed with. When there is a little motion the output frame $OP_i$ may be produced from the intermediate frames $IM_{ia}$, $IM_{ib}$, but not the input frame $IP_i$. With more motion, then two additional motion compensated temporally interpolated frames $IM_{ic}$, $IM_{id}$ may be produced, temporally offset by ±3.9 ms to either side of the input frame $IP_i$ and with temporal interpolation ratios of 0.91:0.09 and 0.09:0.91, respectively, and equal weighting ratios. There is then almost temporal overlap of the acquisition period and simulated acquisition periods of the five frames $IM_{ia}$, $IM_{ic}$, $IP_i$, $IM_{id}$, $IM_{ib}$, but if desired a further two intermediate frames could be produced and the interpolation ratios changed so that there i s overlap. Furthermore, the number of intermediate frames may be varied automatically in dependence upon the maximum speed of motion in the picture by determining the magnitude of the largest motion vector and selecting the number of intermediate frames in dependence upon that magnitude and a predetermined algorithm.

FIG. 2 illustrates a further method which deals with frame rate conversion from 30 frame/s to 24 frame/s in addition to increasing the motion blur characteristic from 16.7 ms (corresponding to a shutter angle of 180° at 30 frame/s) to 19.2 ms (corresponding to a shutter angle of 166° at 24 frame/s). FIG. 2 shows six of a series of input frames $IP_1$ to $IP_5$ and $IP_1''$, and five of a series of output frames $OP_1$ to $OP_4$ and $OP_1''$. The input frame $IP_1$ is temporally aligned with the output frame $OP_1$ and the input frame $IP_1''$ is temporally aligned with the output frame $OP_1''$. However, the output frame $OP_2$ is temporally offset one-quarter of the way between input frames $IP_2$, $IP_3$. Also, output frame $OP_3$ is temporally offset half-way between input frames $IP_3$, $IP_4$. Lastly, output frame $OP_4$ is temporally offset three-quarters of the way between input frames $IP_4$, $IP_5$. The methods of producing the output frames $OP_1$ to $OP_4$ differ from each other, but the sequence of methods repeat with every five input frames, or four output frames. As in the case of the FIG. 1 arrangement, for each output frame $OP_1$, a respective pair of intermediate frames $IM_{ia}$, $IM_{ib}$ are produced from the input frames by motion compensated temporal interpolation. The intermediate frames have an effective acquisition period equal to the acquisition period of the input frames. In order to provide a simulated acquisition period of 19.2 ms for the output frames, the intermediate frames of each pair are temporally interpolated so as to be temporally offset from each other by $19.2 - 16.7$ ms $= 2.5$ ms. Thus the pixel values of the intermediate frames are calculated as follows:

$$IM_{1b}(x,y) = \frac{IP_1((x,y) - 0.04(m_{x1b}, m_{y1b})) + IP_2((x,y) + 0.96(m_{x1b}, m_{y1b}))}{2} \quad (4)$$

$$IM_{2a}(x,y) = \frac{IP_2((x,y) - 0.21(m_{x2a}, m_{y2a})) + IP_3((x,y) + 0.79(m_{x2a}, m_{y2a}))}{2} \quad (5)$$

$$IM_{2b}(x,y) = \frac{IP_2((x,y) - 0.29(m_{x2b}, m_{y2b})) + IP_3((x,y) + 0.71(m_{x2b}, m_{y2b}))}{2} \quad (6)$$

$$IM_{3a}(x,y) = \frac{IP_3((x,y) - 0.46(m_{x3a}, m_{y3a})) + IP_4((x,y) + 0.54(m_{x3a}, m_{y3a}))}{2} \quad (7)$$

$$IM_{3b}(x,y) = \frac{IP_3((x,y) - 0.54(m_{x3b}, m_{y3b})) + IP_4((x,y) + 0.46(m_{x3b}, m_{y3b}))}{2} \quad (8)$$

$$IM_{4a}(x,y) = \frac{IP_4((x,y) - 0.71(m_{x4a}, m_{y4a})) + IP_5((x,y) + 0.29(m_{x4a}, m_{y4a}))}{2} \quad (9)$$

$$IM_{4b}(x,y) = \frac{IP_4((x,y) - 0.79(m_{x4b}, m_{y4b})) + IP_5((x,y) + 0.21(m_{x4b}, m_{y4b}))}{2} \quad (10)$$

$$IM_{1a}(x,y) = \frac{IP_5((x,y) - 0.96(m_{x1a}, m_{y1a})) + IP_1''((x,y) + 0.04(m_{x1a}, m_{y1a}))}{2} \quad (11)$$

Each output frame $OP_i$ is then produced by averaging the two respective intermediate frames $IM_{ia}$, $IM_{ib}$, that is to say:

$$OP_i(x,y) = \frac{IM_{ia}(x,y) + IM_{ib}(x,y)}{2} \quad (12)$$

FIG. 3 shows an arrangement similar to that of FIG. 2, with the exception that, instead of producing pairs of intermediate frames $IM_{ia}$, $IM_{ib}$, pairs of intermediate fields $IM_i^-$, $IM_i^+$ of opposite polarity are produced, and the output frames $OP_i$ are produced by interlacing the respective intermediate field pairs $IM_i^-$, $IM_i^+$. This arrangement therefore produces the increased motion blur characteristic by an interlace smear effect. As compared with the FIG. 2 arrangement, the arrangement of FIG. 3 decreases by one half the number of motion compensated temporal interpolation calculations which must be performed and obviates the need for the averaging operation.

As mentioned above with reference to FIG. 1, the number of intermediate frames which are produced for each output frame may be selected in dependence upon the maximum speed of motion in the picture. It will be noted, however, from FIGS. 2 and 3 that where there is only a small difference in the integration times of the input and output frames, there is a large degree of temporal overlap between the intermediate frames (or fields) of each pair, and therefore there will be little need to produce more than two intermediate frames (or fields) for each output frame. In an apparatus which is capable of performing the above methods and in which the increase in integration time is variable, the number of intermediate frames (or fields) which are produced for each output frame is preferably made automatically dependent not only on the detected maximum speed of motion in the picture but also upon the proportionate increase in integration time as between the input frames and output frames.

In a further modification of the arrangement as shown in FIG. 1, instead of producing two motion compensated temporally interpolated intermediate frames :for each output frame, and combining them with the respective input frame to form the output frame, only one motion compensated temporally interpolated intermediate frame may be produced but with double the temporal offset from the input frame. This also reduces the number of interpolation calculations which need to be carried out. Somewhat similarly, in a modification to the FIG. 3 arrangement, is read of producing two motion compensated temporally interpolated intermediate fields for each output frame, and interlacing them to produce the output frame, only one motion compensated temporally interpolated intermediate field may be produced but with double the temporal offset from the input frame, and the intermediate field can then be interlaced with the lines of the opposite polarity field of the input frame to produce the output frame. Again, this reduces the number of interpolation calculations which need to be carried out as compared with the FIG. 3 arrangement. This modification cannot be used in the case where there is a change of frame rate, as in FIG. 3, only where the input and output frame rates are the same, as in FIG. 1.

An apparatus for performing the above methods may be based upon the motion compensated temporal interpolation apparatus described in detail in patent applications GB 2231228A and GB 2249907A, to which reference is directed. It is, however, necessary to modify that apparatus as shown in FIG. 4.

Figure 4:
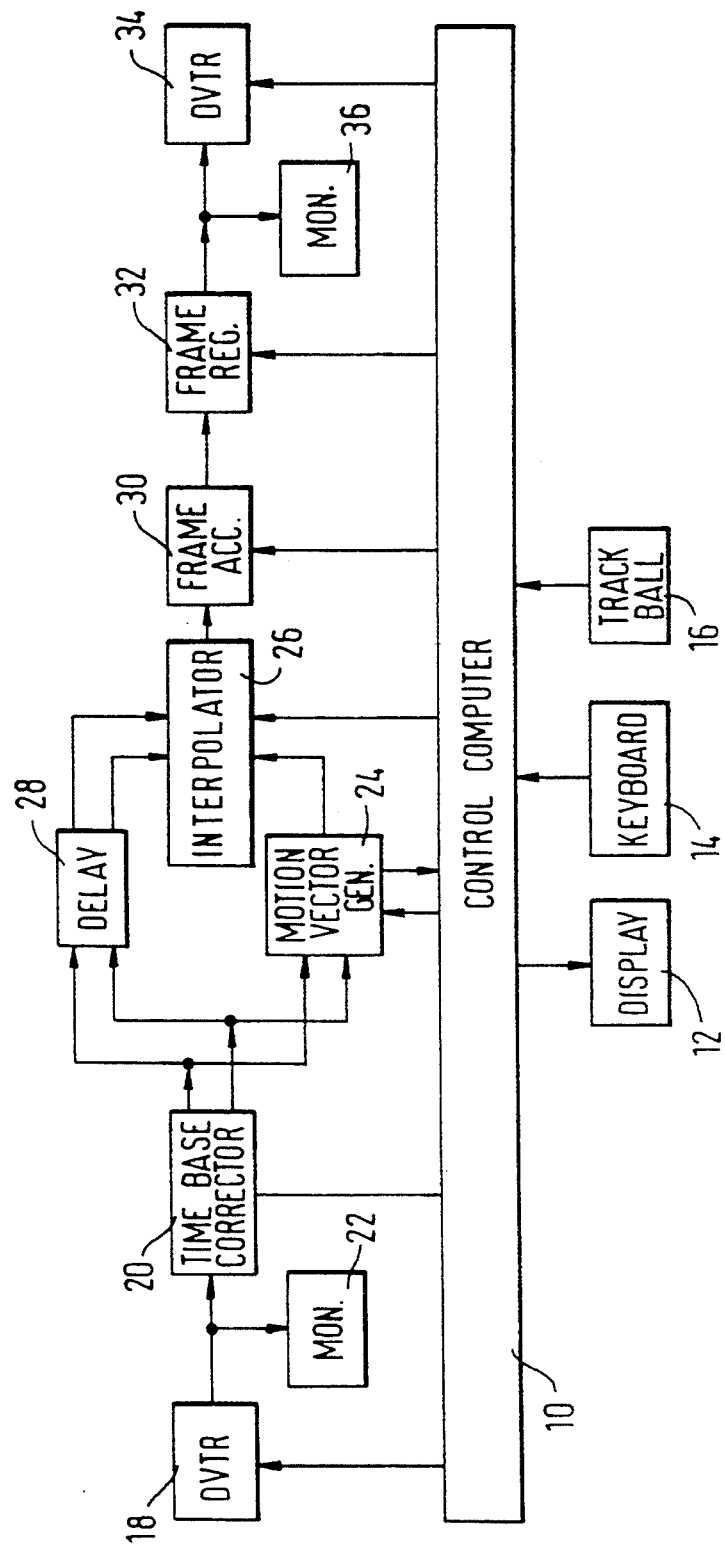
FIG. 4 is a block diagram of an embodiment of an apparatus according to the invention.

Referring to FIG. 4, the apparatus comprises a control computer 10 with associated display 12, keyboard 14 and track ball 16. An input digital video tape recorder (DVTR) 18 under control of the computer 10 supplies a slow motion video signal to a time base corrector 20 and a monitor 22. The time base corrector 20 is under control of the computer 10 which ensures that tile time base corrector temporarily stores and supplies a proper pair of frames to a motion vector generator 24 and to an interpolator 26 (via a delay 28). As described in detail in the above-mentioned patent applications, the motion vector generator 24 analyses the input pair of frames and generates a set of motion vectors $(m_x, m_y)$ related to the desired output frame (now termed the intermediate frame or field) indicating for each pixel in the intermediate frame/field the motion of that pixel in the output picture. The motion vectors are supplied by the generator 24 to the interpolator 26, which under control of the computer 10, interpolates the intermediate output frame/field temporally part-way between the input frames supplied from the delay 28 in accordance with the formulae set out above, for example formulae 1 and 2, or formulae 4 to 11. The intermediate frames/fields are output to a frame accumulator 30 which, under control of the computer, averages or combines the appropriate intermediate frames/fields, for example in accordance with equations 3 and 12 above, to produce the output frames. The output frames, which are produced in slow motion, are supplied to a silicon frame recorder 32 which stores groups of the frames which are then output at normal speed and recorded to an output DVTR 34 operating in burst-mode and displayed on an associated monitor 36.

For each pair of input frames, the motion vector generator 24 also determines the motion vector having the greatest magnitude and supplies that magnitude to the control computer 10. The control computer is programmed with a set of rules as to how many intermediate frames/fields to interpolate for each output frame in dependence upon the supplied magnitude and the proportionate difference between the input and output blur characteristics (as entered via the keyboard 14), and the computer controls the remainder of the apparatus accordingly.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. A method of processing an input digital video signal having input frames and a motion blur characteristic, comprising the steps of:

producing at least two intermediate frames or fields by motion compensated temporal interpolation between adjacent input frames, a pair of said at least two intermediate frames or fields having complementary interpolation ratios relative to said adjacent input frames; and combining at least two frames or fields chosen from the group consisting of said adjacent input frames and said at least two intermediate frames or fields to form an output frame having a motion blur characteristic greater than the motion blur characteristic of said adjacent input frames.

2. A method of processing an input digital video signal representing a series of input frames and having a motion blur characteristic, comprising the steps of:

producing at least one intermediate field or frame by motion compensated temporal interpolation between a pair of the input frames; and combining the one intermediate field or frame with at least one field or frame chosen from the group consisting of a further intermediate field or frame and one of the pair of input frames to form an output frame having an increased motion blur characteristic compared with that of the input frames.

3. A method as claimed in claim 2, and having a mode in which more than two intermediate frames are produced for each output frame.

4. A method as claimed in claim 3, and having a submode including the step of averaging the values of corresponding pixels in said more than two intermediate frames produced for said each output frame to form the pixels of said each output frame.

5. A method as claimed in claim 3, and having a submode including the step of averaging the values of corresponding pixels in said more than two intermediate frames produced for said each output frame and one of said pair of input frames to form the pixels of said each output frame.

6. A method as claimed in claim 2, and having a mode in which two intermediate frames are produced for each output frame.

7. A method as claimed in claim 6, and having a submode including the step of averaging the values of corresponding pixels in said two intermediate frames produced for said each output frame to form the pixels of said each output frame.

8. A method as claimed in claim 6, and having a submode including the step of averaging the values of corresponding pixels in said two intermediate frames produced for said each output frame and one of said pair of input frames to form the pixels of said each output frame.

9. A method as claimed in claim 2, and having a mode in which one intermediate frame is produced for each output frame and including the step of averaging the values of corresponding pixels in said one intermediate frame and one of said pair of input frames to form the pixels of said each output frame.

10. A method as claimed in claim 2, and having a mode in which two intermediate fields are produced for each output frame, and including the step of interlacing said two intermediate fields to form said each output frame.

11. A method as claimed in claim 2, and having a mode in which one intermediate field is produced for each output frame, and including the step of interlacing said one intermediate field with an opposite polarity field of one of said pair of input frames to form said each output frame.

12. A method as claimed in claim 2 and having at least two of the following modes:

a first mode in which more than two intermediate frames are produced for each output frame, and including the step of averaging the values of corresponding pixels in the intermediate frames to form pixels in said each output frame;

a second mode in which two intermediate frames are produced for each output frame, and including the step of averaging the values of corresponding pixels in the two intermediate frames to form pixels in said each output frame;

a third mode in which more than two intermediate frames are produced for each output frame, and including the step of averaging the values of corresponding pixels in the intermediate frames and one of the pair of input frames to form pixels in said each output frame;

a fourth mode in which two intermediate frames are produced for each output frame, and including the step of averaging the values of corresponding pixels in the two intermediate frames and one of the pair of input frames to form pixels in said each output frame;

a fifth mode in which one intermediate frame is produced for each output frame, and including the step of averaging the values of corresponding pixels in the one intermediate frame and one of the pair of input frames to form pixels in said each output frame;

a sixth mode in which two intermediate fields are produced for each output frame, and including the step of interlacing the two intermediate fields to form said each output frame; and a seventh mode in which one intermediate field is produced for each output frame, and including the step of interlacing the one intermediate field with an opposite polarity field of one of the pair of input fields to form said each output frame;

the method further comprising the step of selecting which of these modes to use in dependence upon a maximum speed of motion in an image represented by the input frames.

* * * * *